(12) United States Patent
Knoll

(10) Patent No.: US 7,862,113 B2
(45) Date of Patent: Jan. 4, 2011

(54) MODULAR COMFORT ASSEMBLY DIFFUSER BAG HAVING INTEGRAL AIR MOVER SUPPORT

(75) Inventor: Peter Knoll, La Salle (CA)

(73) Assignee: IGB Automotive Ltd., Windsor (CA)

( * ) Notice: Subject to any disclaimer, the term of this patent is extended or adjusted under 35 U.S.C. 154(b) by 815 days.

(21) Appl. No.: 11/342,754

(22) Filed: Jan. 30, 2006

(65) Prior Publication Data

US 2007/0176471 A1 Aug. 2, 2007

(51) Int. Cl.
*A47C 7/74* (2006.01)
(52) U.S. Cl. .............................. 297/180.14; 297/180.13
(58) Field of Classification Search ............ 297/180.13, 297/180.14, 180.11
See application file for complete search history.

(56) References Cited

U.S. PATENT DOCUMENTS

| | | | | |
|---|---|---|---|---|
| 6,003,950 A | * | 12/1999 | Larsson | 297/180.13 X |
| 6,626,488 B2 | * | 9/2003 | Pfahler | 297/180.11 |
| 6,869,140 B2 | * | 3/2005 | White et al. | 297/180.13 |
| 7,100,978 B2 | * | 9/2006 | Ekern et al. | 297/180.14 |
| 7,147,279 B2 | * | 12/2006 | Bevan et al. | 297/180.14 |
| 7,322,643 B2 | * | 1/2008 | Ishima et al. | 297/180.13 |
| 7,370,911 B2 | * | 5/2008 | Bajic et al. | 297/180.14 X |

* cited by examiner

*Primary Examiner*—Anthony D Barfield
(74) *Attorney, Agent, or Firm*—Fildes & Outland, P.C.

(57) ABSTRACT

A ventilation diffuser bag for disposition on a vehicle occupant support includes a perforated, occupant facing side and an opposite non-perforated, support surface facing side. The non-perforated side includes an opening to allow air flow into the diffuser bag. An air mover support integral with the non-perforated side includes an endless sidewall extending from the opening for providing support for an air mover. The endless sidewall includes a retaining edge spaced from the non-perforated side for suspendably retaining the air mover within the air mover support. The non-perforated side of the diffuser bag is supportable on an occupant facing surface of a vehicle occupant support, and the air mover support extends into the occupant support.

14 Claims, 4 Drawing Sheets

MODULAR COMFORT ASSEMBLY DIFFUSER BAG HAVING INTEGRAL AIR MOVER SUPPORT

TECHNICAL FIELD

This invention relates to the field of comfort systems for occupant supports, and more particularly to ventilation diffuser bags for vehicle seating comfort systems.

BACKGROUND OF THE INVENTION

It is known in the art relating to vehicle occupant support comfort systems, and particularly to occupant support ventilation systems, to separately mount an air mover for the ventilation system into the foam seat cushion of the occupant support. Alternatively, it is also known to mount the air mover onto a frame of the occupant support. The remainder of the ventilation system is then connected in fluid communication with the air mover downstream of the air mover output through ductwork, tubing or other similar means.

For example, a seat cushion of an occupant support may include a plurality of holes for mounting one or more air movers to the seat cushion. Each air mover may then be suspendably supported from one or more of the holes by endless elastic members such as rubber bands to reduce the amount of vibrational noise generated by the air mover. This method of mounting is tedious and time consuming. The method also requires the use of many individual parts, including ductwork to connect the air mover to the ventilation system.

SUMMARY OF THE INVENTION

The present invention provides an improved ventilation diffuser bag for an occupant support comfort system. The diffuser bag has an integral air mover support for supporting and mounting an air mover into the diffuser bag. The present invention eliminates the need to use duct work, tubing, etc. to connect the air mover to the diffuser bag. The present invention also simplifies installation of a ventilation system in an occupant support to a one-piece, drop-in unit, eliminating the need to separately mount and/or suspend an air mover to a seat cushion or other portion of the occupant support.

More particularly, a ventilation diffuser bag for disposition on a vehicle occupant support in accordance with the present invention includes a perforated, occupant facing side and an opposite non-perforated, support surface facing side. The non-perforated side includes an opening to allow air flow into the diffuser bag. An air mover support integral with the non-perforated side includes an endless sidewall extending from the opening for providing support for an air mover. The endless sidewall has a retaining edge spaced from the non-perforated side for suspendably retaining the air mover within the air mover support. The non-perforated side of the diffuser bag is supportable on an occupant facing surface of a vehicle occupant support, and the air mover support extends into the occupant support.

In a specific embodiment, the endless sidewall may include a vibration dampening suspension portion. The endless sidewall may also include a stepped portion. An air mover may be received in the air mover support and retained in the endless sidewall by the retaining edge. An air permeable material may be disposed in the diffuser bag between the perforated side and the non-perforated side. A screen may be mounted in the opening, the screen being disposed within the diffuser bag. A heating element may be mounted on an outer surface of the perforated side. The diffuser bag may be made of a plastic material such as a urethane material or similar. The diffuser bag may also optionally include a lumbar support disposed in the diffuser bag between the perforated side and the non-perforated side.

In another embodiment of the present invention, a vehicle occupant support includes a ventilation diffuser bag allowing for circulation of air through the bag. The diffuser bag has a perforated, occupant facing side and an opposite non-perforated, support surface facing side. The non-perforated side includes an opening to allow air flow into the diffuser bag. An air mover support integral with the non-perforated side includes an endless sidewall extending from the opening for providing support for an air mover. The endless sidewall includes a retaining edge spaced from the non-perforated side for suspendably retaining the air mover within the air mover support. A seat portion has an occupant facing surface and a through hole for the air mover support of the ventilation diffuser bag. The non-perforated side of the diffuser bag is mounted on the occupant facing surface of the seat portion such that the air mover support is disposed in the through hole.

A method of manufacturing a ventilation diffuser bag in accordance with the present invention includes the steps of: providing a perforated, occupant facing side of the diffuser bag; providing an air mover; molding a non-perforated, support facing side of the diffuser bag having an opening to allow air flow therethrough and including an integral air mover support, the air mover support including an endless sidewall extending from the opening for providing support for the air mover, the endless sidewall including a retaining edge spaced from the non-perforated side for suspendably retaining the air mover within the air mover support; mounting the air mover in the air mover support such that the air mover engages the retaining edge; disposing an air permeable material adjacent the non-perforated side; and permanently connecting edges of the perforated, occupant facing side to edges of the non-perforated, support facing side such that the air permeable material is disposed between the perforated side and the non-perforated side.

Optionally, the method may include molding the non-perforated side using a vacuum forming machine. Also, the step of permanently connecting the perforated side to the non-perforated side may include die-electrically welding the perforated side to the non-perforated side. The method may further include the step of laminating a heating element to an outer surface of the perforated side. The method may also include the steps of providing a seat portion of an occupant support having an occupant facing surface; forming a through hole in the seat portion for the air mover support of the ventilation diffuser bag; and mounting the ventilation diffuser bag to the occupant facing surface of the seat portion such that the air mover support is disposed in the through hole.

These and other features and advantages of the invention will be more fully understood from the following detailed description of the invention taken together with the accompanying drawings.

DETAILED DESCRIPTION OF THE INVENTION

Figure 1:
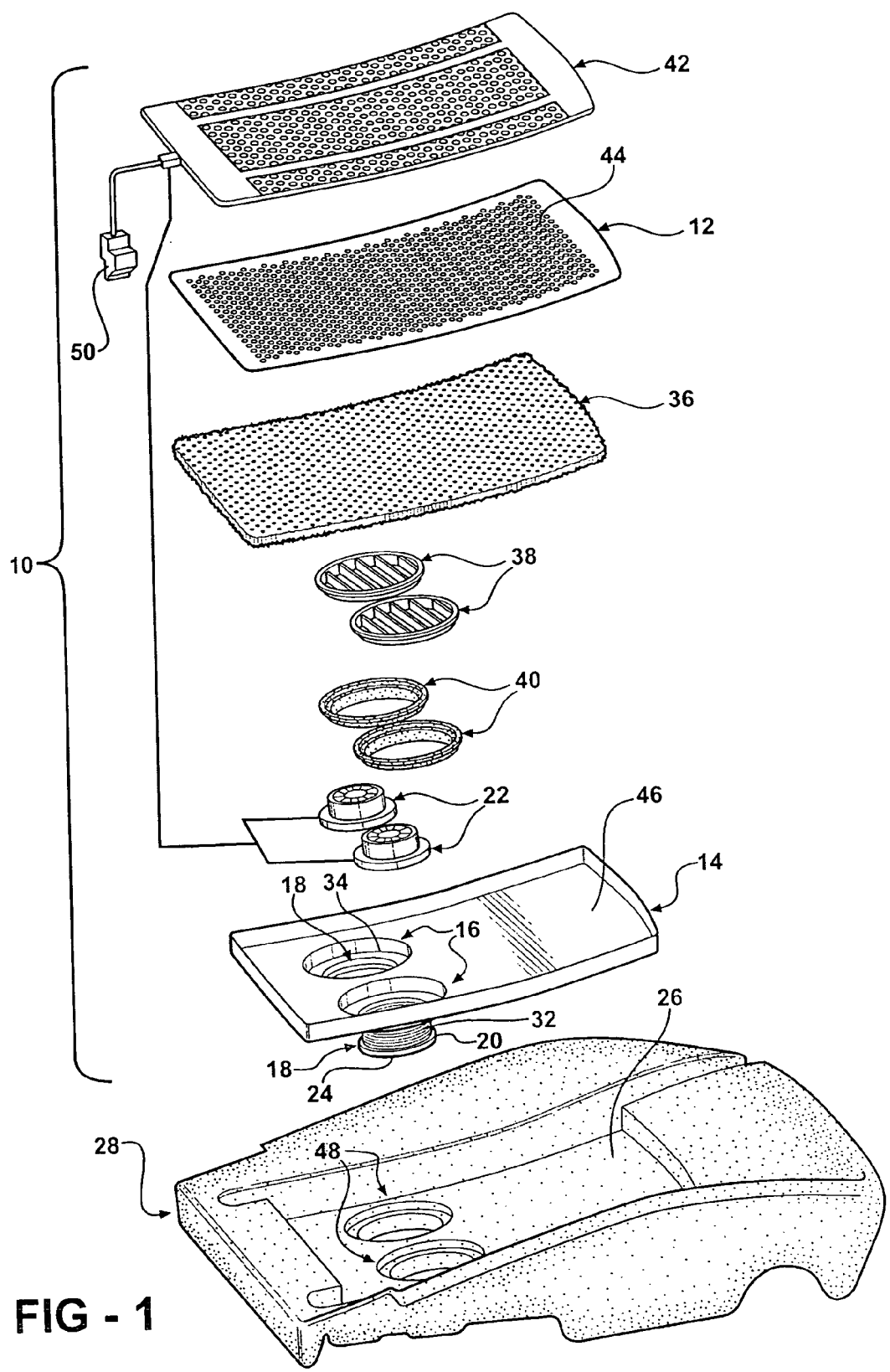
FIG. 1 is an exploded view of a ventilation diffuser bag in accordance with the present invention in combination with a seat portion of a vehicle occupant support.

Referring now to the drawings in detail, numeral 10 generally indicates a ventilation diffuser bag for disposition on a seat portion of a vehicle occupant support in accordance with the present invention. The ventilation diffuser bag 10 is a "drop-in" vehicle occupant support comfort system that may be installed directly on a seat portion of a vehicle occupant support without connecting the ventilation diffuser bag to other separate parts. The ventilation diffuser bag 10 eliminates the need for any separate or additional airflow ductwork in the occupant support. The ventilation diffuser bag 10 also does not require a separate air mover that would have to be mounted to a portion of the occupant support.

Figure 2:
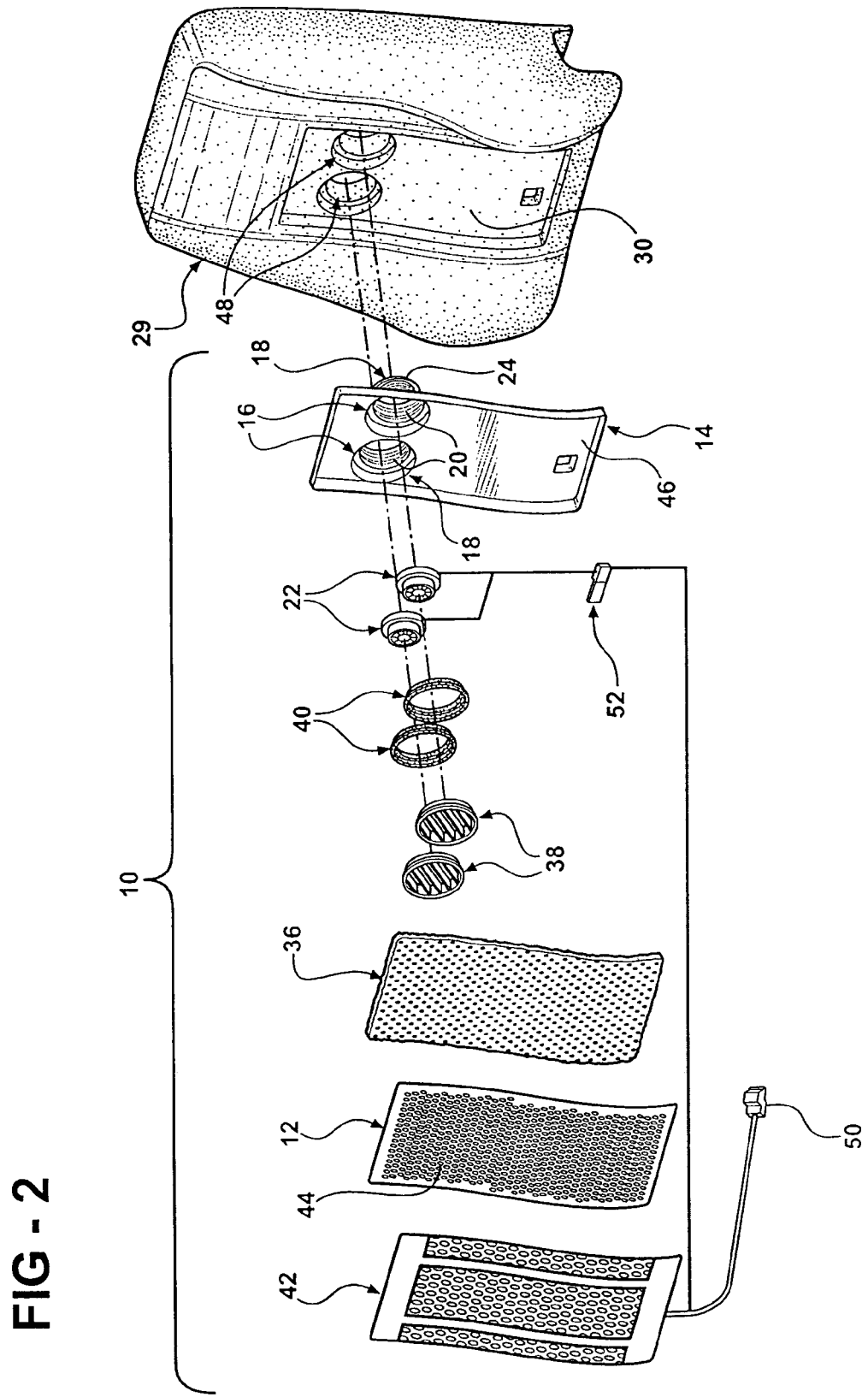
FIG. 2 is an exploded view of the ventilation diffuser bag of FIG. 1 in combination with another seat portion of a vehicle occupant support.
Figure 4:
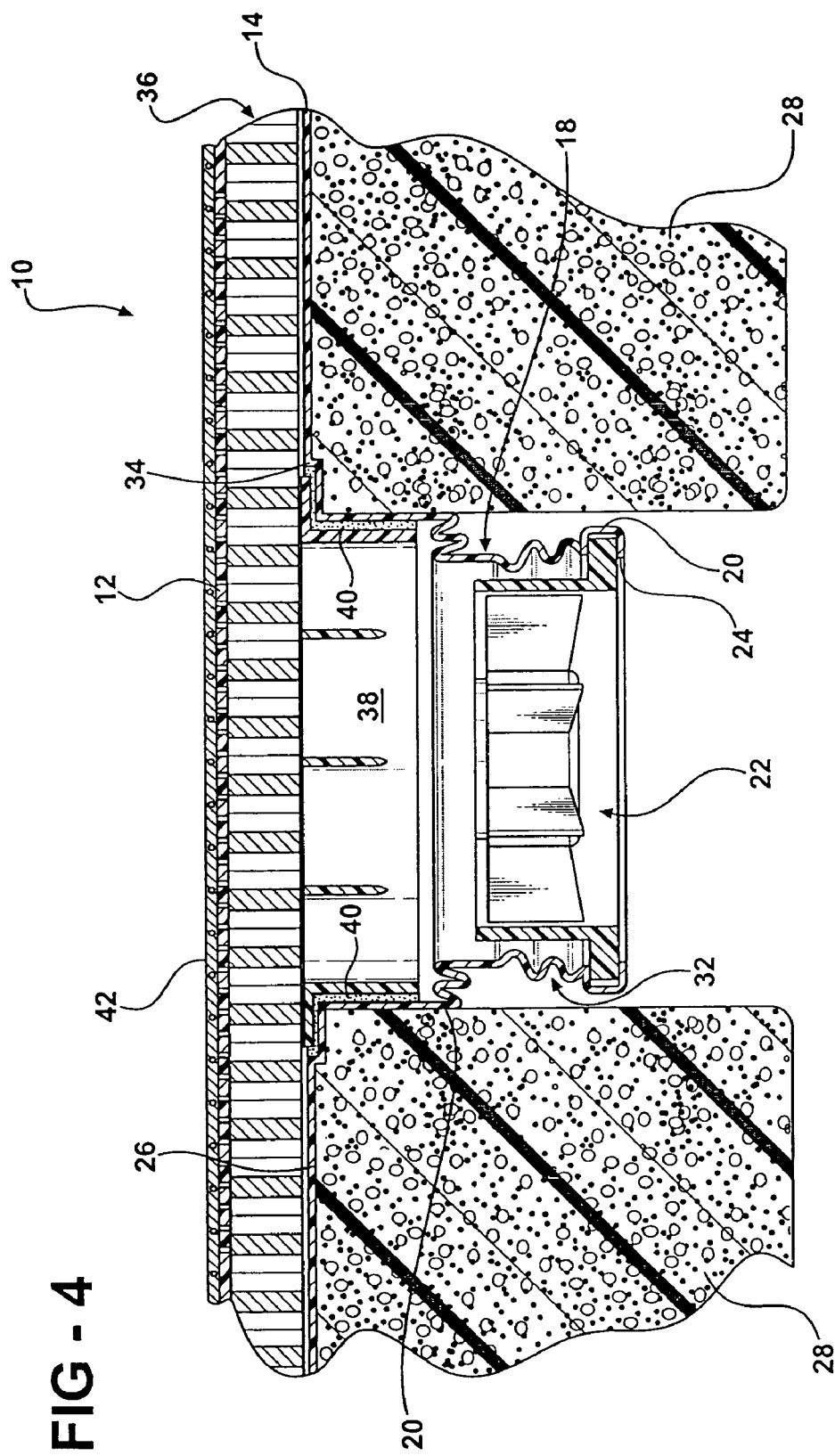
FIG. 4 is a sectional view of a ventilation diffuser bag in accordance with the present invention installed in a seat portion of a vehicle occupant support.

Turning first to FIGS. 1, 2, and 4, the ventilation diffuser bag 10 includes a perforated, occupant facing side 12 and an opposite non-perforated, support surface facing side 14. The perforations in the perforated side 12 allow for air flow out of the bag towards an occupant seated on the occupant support. The perforated side 12 is referred to as occupant facing for the reason that, when the diffuser bag 10 is installed on an occupant support, the perforated side faces an occupant that is seated on the occupant support. Likewise, the non-perforated side 14 is referred to as support surface facing for the reason that, when the diffuser bag 10 is installed on an occupant support, the non-perforated side faces a support surface of the occupant support for mounting of the diffuser bag to the support surface. The sides 12, 14 of the diffuser bag 10 may be made of a plastic material such as a urethane material or similar, or a material that is permeable like a felt or a fleece type of material.

The non-perforated side 14 includes an opening 16 to allow air flow into the diffuser bag 10. In the embodiment shown, the opening is generally circular, although other shapes are within the scope of the invention. An air mover support 18 integral with the non-perforated side 14 includes an endless sidewall 20 extending from the opening 16 for providing support for an air mover 22. The air mover 22 may be a fan, blower, or similar device capable of creating a flow of air. The air mover support 18 may be molded together with the non-perforated side 14, or may be separately molded and then adhered or die-electrically welded to the non-perforated side 14 around the opening 16. If the air mover support 18 is separately molded, it may be made from a material such as gel silicon, rubber, a urethane material, or similar. In this embodiment, the endless sidewall 20 is generally tubular and generally circular in cross-section. The endless sidewall 20 has a retaining edge 24 spaced from the non-perforated side 14 for suspendably retaining the air mover 22 within the air mover support 18. The air mover 22 is received in the air mover support 18 and retained in the endless sidewall 20 by the retaining edge 24. The non-perforated side 14 of the diffuser bag 10 is supportable on an occupant facing surface 26 of a seat portion 28 a vehicle occupant support, and the air mover support 18 extends into the occupant support. The seat portion 28 may be a foam bun or similar. In FIG. 1, the seat portion 28 is shown as a lower seat cushion portion of the occupant support. Alternatively, in FIG. 2, the seat portion 29 is shown as an upper back rest portion of the occupant support having an occupant facing surface 30.

The endless sidewall 20 may include a vibration dampening suspension portion 32. The suspension portion 32 may be a corrugated portion of the endless sidewall 20 that can expand and contract to absorb vibrations such as those caused by an air mover 22 held by the air mover support 18. The suspension portion 32 is also configured to allow for multi-directional movement of the air mover support 18. The endless sidewall 20 may also include a stepped portion 34.

The diffuser bag 10 may optionally include more than one air mover support 18 and correspondingly, more than one air mover 22, each air mover 22 being received and retained in an individual air mover support 18. In the embodiment shown in FIGS. 1 and 2, the diffuser bag 10 includes two air mover supports 18 and likewise two air movers 22.

An air permeable material 36, such as an air permeable fabric, may be disposed in the diffuser bag 10 between the perforated side 12 and the non-perforated side 14. The air permeable material 36 provides for an even distribution of air throughout the diffuser bag 10. A screen 38 may be mounted in the opening 16 inside of the diffuser bag 10. For example, the screen 38 may be supported by the stepped portion 34 of the air mover support 18. The screen 38 may also be supported around the edge of the opening 16 by a flexible and/or adhesive support ring 40 such as a rubber ring. The screen 38 may be a plastic injection molded member that is mounted to the inside of the diffuser bag 10 over the opening 16 with an adhesive such as a hot-melt adhesive, a double coated adhesive, or similar.

A heating element 42 may be mounted on an outer surface 44 of the perforated side 12. For example, the heating element 42 may be laminated onto the outer surface 44 of the perforated side 12, although other similar mounting means, such as a double sided adhesive or web adhesive, are within the scope of the invention. The heating element 42 is sufficiently flexible to adjust to the contours of the diffuser bag 10 and an occupant support to which the diffuser bag may be mounted. The heating element 42 may be of the type comprising a permeable carrier mesh material and a carbon material carried by the permeable mesh material. In one embodiment, the heating element 42 may be a two-dimensional heating element having a textile base material, such as, for example, a nonwoven or a textile filament material which acts as a carrier for electrically conductive contacts and heating conductors that touch one another and form an electric connection. Sending of an electric current through the conductive contacts thereby sends a current through the heating conductors, producing heat and warming the heating element. Air moved through the diffuser bag 10 and out of the perforations in the perforated side 12 then passes through the permeable carrier material of the heating element 42, warming the air and improving delivery of heat to an occupant seated in the occupant support.

The diffuser bag 10 may be manufactured in the following manner. The perforated, occupant facing side 12 of the diffuser bag 10 may be molded or may be cut from a sheet of material such as a plastics material or similar that is perforated to form a plurality of small air holes. The air mover 22 may be obtained by modifying an existing air mover to be receivable in the air mover support 18 or by original fabrication of an air mover sized to fit in the air mover support 18. Further, the non-perforated, support facing side 14 of the diffuser bag 10 may be molded using a vacuum-forming machine or other similarly suitable molding device. As described above, the air mover support 18 may be formed as part of the mold for the non-perforated side 14 or may be separately molded and then permanently connected to the non-perforated side 14 using an adhesive or by welding such as die-electric welding.

Next, the air mover 22 is disposed in and suspendably retained by the air mover support 18 such that the air mover 22 engages the retaining edge 24 of the endless sidewall 20. Then, the screen 38 and if necessary the support ring 40 may be mounted to the non-perforated side 14 opposite the retaining edge 24 to cover the opening 16. A hot-melt or double coated adhesive may be used to mount the screen 38. The air permeable material 36 is disposed adjacent the non-perforated side 14 so that the air permeable material 36 may be disposed on the inside of the diffuser bag 10. The non-perforated side 14 may include a recess 46 sized to receive the air permeable material 36 and to facilitate disposition of the air permeable material. Then, edges of the perforated side 12 are permanently connected to edges of the non-perforated side 14 such that the air permeable material 36 is disposed between the perforated side 12 and the non-perforated side 14. The sides 12, 14 of the diffuser bag 10 may be permanently connected by die-electrical welding or by any other suitable means of permanent connection.

Optionally, if the diffuser bag 10 includes a heating element 42, the heating element may be directly mounted to the outer surface 44 of the perforated side 12 by lamination, web adhesive, a double sided adhesive, a glue adhesive, or similar.

To mount the diffuser bag 10 to an occupant facing surface 26 of a seat portion 28 of an occupant support, through hole(s) 48 must be present in the seat portion 28 for each air mover support 18 of the diffuser bag 10. If the seat portion 28 is not originally made with a through hole or holes 28, a through hole 28 must be formed in the seat portion 28 for each air mover support 18 by removing pieces of the seat portion 28 in the shape of the through hole(s) 28. The diffuser bag 10 may then be mounted to the seat portion 28 by placing double sided adhesive, Velcro, or similar on the non-perforated side 14, disposing the non-perforated side towards the occupant facing surface 26, disposing the air mover support(s) 18 in the through hole(s) 48, and adhering the non-perforated side 14 to the occupant facing surface 26 of the seat portion 28.

The air mover 22 and the heating element 42 may be electrically connected to a main harness (not shown) of the vehicle occupant support by a harness 50. The air mover 22 and heating element 42 may each be separately controlled by a controller such as a module 52. The module 52 for the air mover 22 may be disposed inside of the diffuser bag 10. Alternatively, a single control module may control both the air mover 22 and the heating element 42.

When the ventilation diffuser bag 10 is in operation, the air mover 22 draws air from the environment surrounding the occupant support into the diffuser bag 10. As air enters the diffuser bag 10, the air permeable material 36 inside of the diffuser bag 10 functions to evenly spread the air throughout the bag. The air exits the diffuser bag 10 through the perforations in the perforated, occupant facing side 12. If the heating element 42 is kept off, the air exiting the diffuser bag 10 passes by an occupant seated in the vehicle occupant support, cooling the occupant. If the heating element is on, the air exiting the diffuser bag 10 is warmed by the heating element 42. The warmed air passes to the occupant of the vehicle occupant support, which in combination with the direct heat of the heating element 42 warms the occupant. The module(s) adjust the rotational speed of the air mover 22 and the current flow through the heating element 42 depending upon the desired temperature for the occupant of the vehicle occupant support. Another alternative operational setting is to operate the heating element without running the air mover, warming the occupant by conduction alone.

Figure 3:
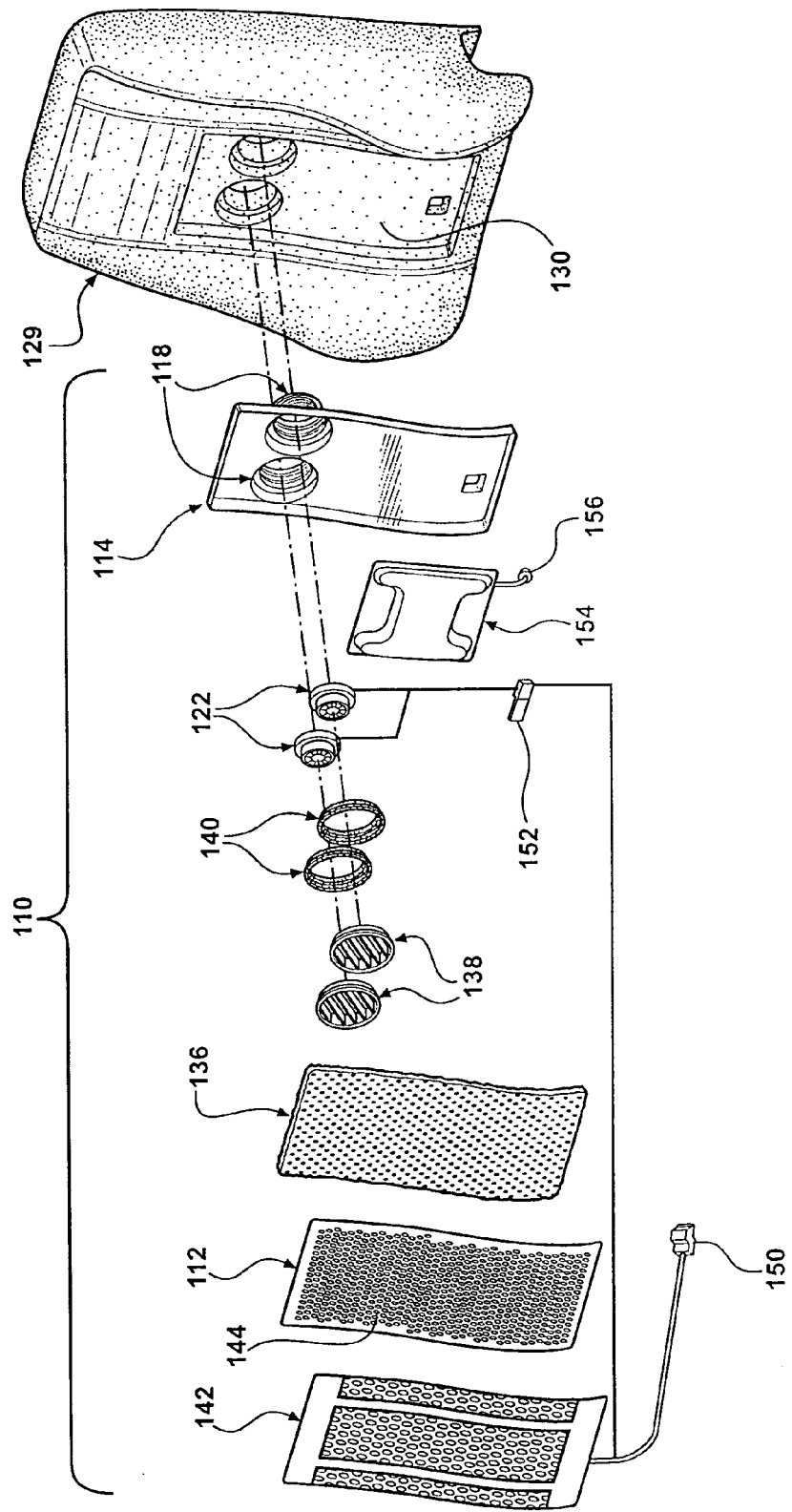
FIG. 3 is an exploded view of an alternative embodiment of a ventilation diffuser bag in accordance with the present invention in combination with a seat portion of a vehicle occupant support.

Turning to FIG. 3, in an alternative embodiment, a diffuser bag 110 in accordance with the present invention may additionally include a lumbar support 154 disposed in the diffuser bag 110 between the perforated side 112 and the non-perforated side 114. The lumbar support 154 may include internal baffles (not shown) and an air inlet 156 that may be connected to an air pump for inflating and deflating the lumbar support 154. The diffuser bag 110 may also include any of the features found in the first embodiment 10, wherein similar reference numerals represent similar features. The diffuser bag 110 including heating element 142 and lumbar support 154 is mountable on an occupant facing surface 130 of a vehicle occupant support 129. The integration of a lumbar support 154 in the diffuser bag 110 allows for the installation of the diffuser bag 110, associated air mover 122, heating element 142, and lumbar support 154 in one simple unit.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A ventilation diffuser bag for disposition on a vehicle occupant support, the ventilation diffuser bag comprising:
   a perforated, occupant facing side and an opposite non-perforated, support surface facing side;
   said non-perforated side including an opening to allow air flow into said diffuser bag; and
   an air mover support integral with said non-perforated side including a generally tubular endless sidewall extending axially from said opening and terminating at a free end free of attachment for providing support for an air mover;
   said endless sidewall including an expandable and contractible corrugated vibration dampening suspension portion and a retaining edge disposed at the free end and spaced from said non-perforated side for suspendably retaining said air mover within said air mover support at said free end;
   wherein said non-perforated side of said diffuser bag is supportable on an occupant facing surface of a vehicle occupant support and said air mover support vibration dampening suspension portion completely non-contactingly extends into said occupant support.

2. The diffuser bag of claim 1, wherein said endless sidewall includes a stepped portion.

3. The diffuser bag of claim 1, including an air mover received in said air mover support and retained in said endless sidewall by said retaining edge.

4. The diffuser bag of claim 1, including an air permeable material disposed in said diffuser bag between said perforated side and said non-perforated side.

5. The diffuser bag of claim 1, including a screen mounted in said opening, said screen being disposed within said diffuser bag.

6. The diffuser bag of claim 1, including a heating element mounted on an outer surface of said perforated side.

7. The diffuser bag of claim 1, wherein said diffuser bag comprises a plastic material.

8. The diffuser bag of claim 1, including a lumbar support disposed in said diffuser bag between said perforated side and said non-perforated side.

9. A diffuser bag as in claim 1 in combination with a vehicle occupant support.

10. A vehicle occupant support comprising:

a ventilation diffuser bag allowing for circulation of air through said bag;

said diffuser bag having a perforated, occupant facing side and an opposite non-perforated, support surface facing side;

said non-perforated side including an opening to allow air flow into said diffuser bag;

an air mover support integral with said non-perforated side including a generally tubular endless sidewall extending axially from said opening and terminating at a free end free of attachment for providing support for an air mover;

said endless sidewall including an expandable and contractible corrugated vibration dampening suspension portion and a retaining edge disposed at the free end and spaced from said non-perforated side for suspendably retaining said air mover within said air mover support at said free end; and a seat portion having an occupant facing surface and a through hole for said air mover support of said ventilation diffuser bag; and said non-perforated side of said diffuser bag being mounted on said occupant facing surface of said seat portion such that said air mover support vibration dampening suspension portion is completely non-contactingly disposed in said through hole.

11. The vehicle occupant support of claim 10, including an air permeable material encapsulated within said diffuser bag.

12. The vehicle occupant support of claim 10, including a heating element mounted on said perforated, occupant facing side of said diffuser bag.

13. The vehicle occupant support of claim 10, wherein said endless sidewall includes a stepped portion engagable with a stepped portion of said occupant facing surface adjacent said through hole to suspend said suspension portion of said endless sidewall within said through hole.

14. The vehicle occupant support of claim 10, wherein said diffuser bag includes a screen mounted in said opening, said screen being disposed within said diffuser bag.

* * * * *